United States Patent [19]
Leker

[11] Patent Number: 5,495,713
[45] Date of Patent: Mar. 5, 1996

[54] HYDROSTATIC DIFFERENTIAL TRANSMISSION

[76] Inventor: Richard E. Leker, R.R. 1, Box 93B, Emerado, N. Dak. 58228

[21] Appl. No.: 343,250

[22] Filed: Nov. 22, 1994

[51] Int. Cl.⁶ .................................................. F16D 39/00
[52] U.S. Cl. ........................................................ 60/488
[58] Field of Search ............................. 60/488, 489, 444

[56] References Cited

U.S. PATENT DOCUMENTS

| | | | |
|---|---|---|---|
| 4,075,843 | 2/1978 | Leker | 60/487 |
| 5,052,987 | 10/1991 | Hagin et al. | 475/82 |
| 5,054,289 | 10/1991 | Nagatomo | 60/468 |
| 5,137,100 | 8/1992 | Scott et al. | 180/6.48 |
| 5,137,129 | 8/1992 | Fleming | 192/58 R |

*Primary Examiner*—F. Daniel Lopez
*Attorney, Agent, or Firm*—Zarley, McKee, Thomte, Voorhees & Sease; Mark D. Frederiksen

[57] ABSTRACT

A hydrostatic differential transmission includes a pair of cylinder housings (58, 62) rotatably mounted for free rotation on coaxial input and output shafts, respectively, with a first pivotable swash plate (101) and second fixed swash plate (24b) fixed to the input and output shafts, respectively and a differential. An adjustable control selectively pivots the first swash plate between a neutral position, where the swash plate is at an angle to the input shaft equal to the angle of the second swash plate to the output shaft, and a direct drive position, where the swash plate is perpendicular to the input shaft. The differential includes a forward ring gear (32) fixed to the input shaft, a rearward ring gear (30) fixed to the output shaft and pinion gears (38, 40) between the forward and rearward ring gears. The pair of cylinder housings rotate together (via 36, 96) and have the pinion gears rotatably mounted thereto, for driving an auxiliary pump (48).

6 Claims, 4 Drawing Sheets

HYDROSTATIC DIFFERENTIAL TRANSMISSION

TECHNICAL FIELD

The present invention relates generally to hydraulic transmissions, and more particularly to an improved hydrostatic differential transmission with an input shaft carrying a housing which provides power through a set of pinion gears on a differential to the output housing carried on the output shaft.

BACKGROUND OF THE INVENTION

Hydraulic transmissions are used in a wide variety of vehicles and other equipment to change the ratio of input shaft speed relative to output shaft speed. Conventionally, a high hydraulic pump unit and cooperating swash plate on the input side of the transmission interact to displace hydraulic fluid to an outside pump which in turn interacts with an output side swash plate in a manner to rotate the output shaft. The transmission ratio essentially depends on the fluid displacement ratio of the two pumps.

In standard hydrostatic pumps, a greater flow of hydraulic fluid creates a faster output transmission shaft rotation. Thus, as the ratio of input shaft speed approaches one to one with output shaft speed, the oil flow is greatest. However, this condition also results in many moving parts resulting in wear of the various components during the highest output of the drive.

SUMMARY OF THE INVENTION

It is therefore a general object of the present invention to provide an improved hydrostatic differential transmission in which the transmission ratio is infinitely variable between a neutral condition and a direct drive condition.

Another object of the present invention is to provide a hydrostatic transmission with a differential unit that controls the ratio of the power transmitted.

A further object is to provide a hydrostatic transmission wherein the rotation of pinion gears on a differential unit is controlled by a pair of swash plate pumps.

Yet another object of the present invention is to provide a hydrostatic transmission in which the greatest power output occurs when no oil is being pumped, and no parts are moving.

These and other objects will be apparent to those skilled in the art.

The hydrostatic differential transmission of the present invention includes a pair of hydraulic pumps rotatably mounted for free rotation on coaxial input and output shafts respectively. A pivotable swash plate is mounted on the input shaft adjacent the first pump and presents a surface interacting with pistons slidably mounted in bores in the first pump to effect reciprocating movement of the pistons when the swash plate is oriented at an angle away from perpendicular from the axis of the input shaft. The swash plate is pivotable between a direct-drive position perpendicular to the axis of the input shaft, preventing reciprocation of the pistons, and a neutral position disposed at an angle from perpendicular to the input shaft axis which is the same as the angle of a second swash plate adjacent the second pump. An adjustable control selectively pivots the swash plate to control the ratio of the rotational speeds of the input and output shafts. The second swash plate is mounted on the output shaft adjacent the second pump, to effect reciprocating movement of pistons within bores in the second pump. A differential is rotatably mounted for free rotation between the pumps, and connected to the pumps to rotate therewith. A pair of valve plates are disposed between the differential and each pump, and are freely rotatable mounted on the respective input and output shafts. The valve plates control fluid flow from the pumps through the differential, all of which forms a substantially closed hydraulic circuit. Pinion gears are rotatably mounted around the circumference of the differential, and freely rotate about axes extending radially from the differential. A forward ring gear is located in engagement with a forward tangential side of the pinion gears, and is mounted on an input housing which is directly connected to the input shaft for rotation therewith. A second ring gear is located for operable engagement with the pinion gears diametric to the first ring gear, and is mounted on an output housing which is directly mounted to the output shaft for rotation therewith.

DESCRIPTION OF THE PREFERRED EMBODIMENT

Figure 1:
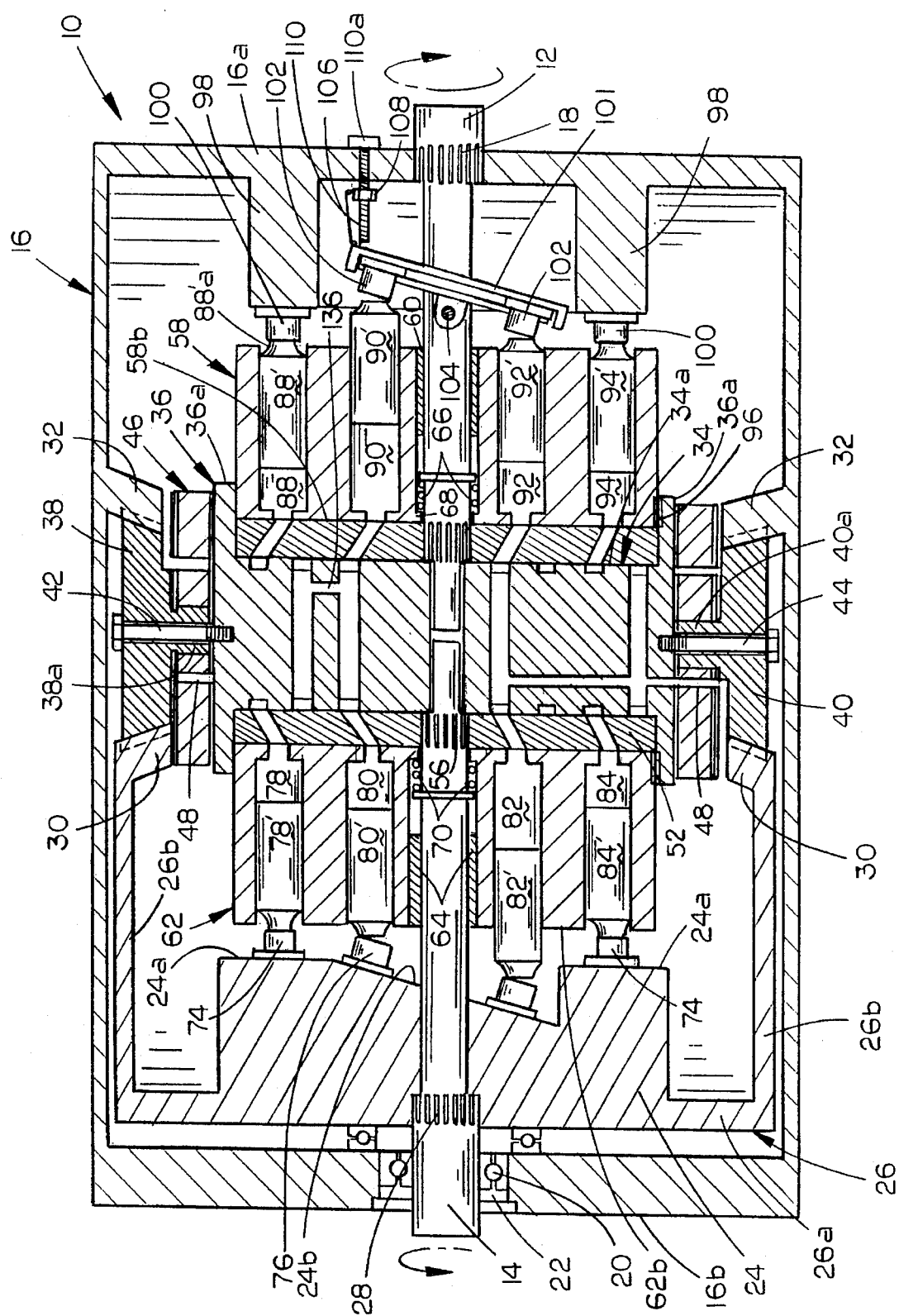
FIG. 1 is a longitudinal sectional view taken centrally through a hydrostatic differential transmission according to a preferred embodiment of the invention, with the transmission in a neutral setting.

Referring now to the drawings, in which similar or corresponding parts are identified with the same reference numeral, and more particularly to FIG. 1, the hydrostatic differential transmission of the present invention is designated generally at 10 which is constructed according to a preferred embodiment of the invention. Transmission 10 transfers power in a variable ratio from an input shaft 12 to an output shaft 14 which is axially aligned therewith. In a normal application, input shaft 12 is rotated by a drive motor, engine, or other power source (not shown).

Input shaft 12 extends through a central opening formed in one end 16a of a generally cylindrical transmission housing 16. Input shaft 12 is connected by splines 18 to housing 16, such that housing 16 rotates with the rotation of shaft 12. Output shaft 14 is mounted for rotational movement within a carrier bearing 20 mounted within an aperture located centrally in second end 16b of housing 16. An oil seal 22 contains oil inside transmission housing 16.

For ease of description, end 16a of housing 16 will be considered the forward end, and end 16b will be considered the rearward end relative to the longitudinal axes of input and output shafts 12 and 14. A fixed swash plate 24 is mounted to the base 26a of a cup-shaped output shaft housing 26, mounted to output shaft 14 with splines 28. Output shaft 14 is mounted through a central aperture through swash plate 24 and outer shaft housing 26, for rotation with output shaft housing 26. Output shaft housing 26 includes a cylindrical side wall 26b projecting forwardly from the perimeter of base 26a within transmission housing 16. A ring gear 30 is formed on the forward end of side wall 26b. A forward ring gear 32 is affixed to the interior surface of housing 16, spaced forwardly from ring gear 30, and coaxial therewith.

The differential housing 34 is a generally disk-shaped member with an annular flange 36 projecting forwardly and rearwardly from the circumference thereof, said differential housing mounted for rotational movement coaxial with input and output shafts 12 and 14. A pair of pinion gears 38 and 40 are rotatably mounted on diametric sides of differential housing 34 on a pair of coaxial shafts 42 and 44 respectively. Shafts 42 and 44 extend along a line forming a diameter through differential housing 34, such that pinion gears 38 and 40 rotate in parallel planes parallel to the axes of input and output shafts 12 and. 14. As shown in FIG. 1, pinion gears 38 and 40 engage ring gears 30 and 32, and are located therebetween on diametric sides of differential housing 34. Pinion gears 38 and 40 are interconnected with the rotor unit 46 of a charge pump (gerotor) along the periphery of shafts 38a and 40a, concentric with rotational shafts 42 and 44. Rotor units 46 of the charge pump provide makeup oil to the supply side of the pump through a passageway 48 extending radially inwardly from rotor unit 46 through differential housing 34.

Figure 6:
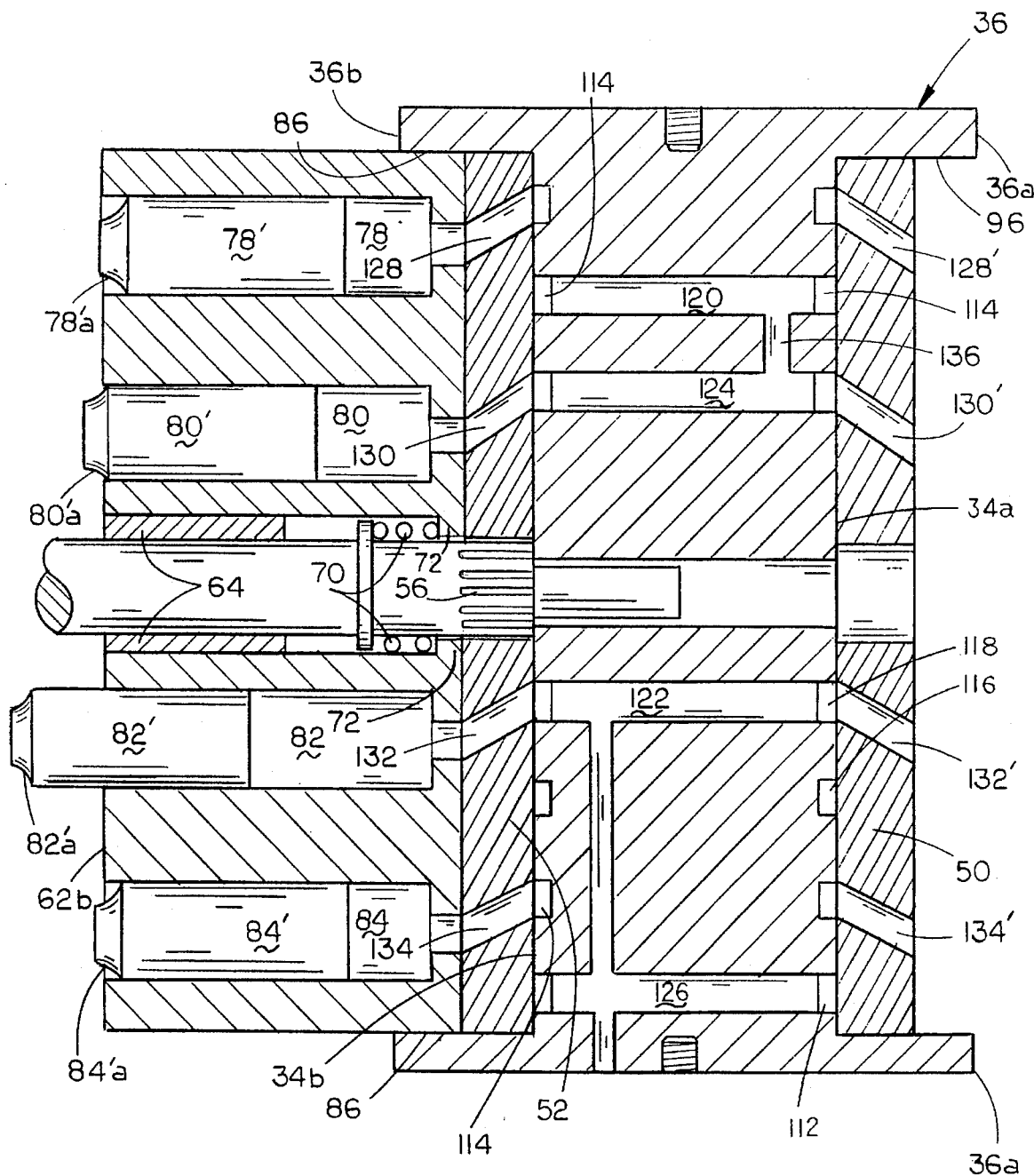
FIG. 6 is an enlarged portion of FIG. 1 showing the differential housing, two valve plates and the rearward pump of the transmission.

A pair of disk-shaped forward and rearward valve plates 50 and 52 (see also FIG. 6) are affixed to the inwardly projecting ends of input and output shafts 12 and 14 respectively, by splines 54 and 56 respectively, for rotation with input and output shafts 12 and 14 respectively. Forward valve plate 50 has a diameter less than the interior diameter of the forwardly projecting lip 36a of flange 36, to fit snugly therein in flush contact with the forward circular face 34a of differential housing 34. Similarly, rearward valve plate 52 has a diameter to fit within the diameter of rearwardly projecting lip 36b of flange 36 in contact with the rearward face 34b of differential housing 34. A cylindrical-shaped forward pump 58 is rotatably mounted on input shaft 12 with a collar bearing 60, and having a diameter equal to that of forward valve plate 50, such that the rearward circular face 58b fits within the diameter of forward lip 36a of flange 36 in contact with the forward face 50a of valve plate 50. Similarly, a rearward pump 62 is rotatably mounted on output shaft 14 with a collar bearing 64 and fits within the diameter of rearwardly projecting lip 36b of flange 36 in contact with the rearward face 52b of rearward valve plate 52. A spring and keeper assembly 66 mounted on input shaft 12 applies a rearwardly directed biasing force on an inwardly and radially directed shoulder 68 of forward pump 58 to keep forward pump 58 in contact with forward valve plate 50 and thereby maintain the contact of forward valve plate 50 with differential housing 34. A similar spring and keeper assembly 70 mounted on output shaft 14 provides a biasing force against a shoulder 72 on rearward pump 62 (as shown in FIG. 6) to provide pressure to keep rearward pump 62 in contact with rearward valve plate 52 and thereby maintain the contact of rearward valve plate 52 with the rearward face of differential housing 34.

The speed of rotation of pinion gears 38 and 40 is determined by the transfer of power from forward ring gear 32 (interconnected to input shaft 12) to rearward ring gear 30 (interconnected to output shaft 14). The rotation of pinion gears 38 and 40 controls the rotation of differential housing 34 on its rotational axis. When the transmission is in a neutral condition, as shown in FIG. 1, the input shaft will be rotating, while the output shaft will not rotate. In this condition, the differential housing 34 will rotate at a rate one-half of the rotational rate of input shaft 12 by virtue of pinion gears 38 and 40. Thus, if input shaft 12 is rotating at 100 rpm, differential housing 34 will be rotating at 50 rpm, and output shaft will be rotating at 0 rpm.

Fixed swash plate 24 has a forward face including a flat annular face 24a, oriented perpendicularly to the longitudinal axis of output shaft 14, and a ring-shaped swash face 24b radially inwardly of annular face 24a which lies within a plane oriented at a predetermined angle between 0° and 45° relative to a plane perpendicular to the output shaft 14. Preferably, the plane of swash face 24b is oriented at an angle of approximately 15° from a plane perpendicular to the longitudinal axis of output shaft 14.

A friction pad 74 is mounted to the ends of each piston 78', 80', 82' and 84' of rearward pump 62 for contact with swash plate faces 24a and 24b, as described in more detail below.

Rearward pump 62 includes eighteen piston chambers arranged along two concentric rings forming inner and outer rings of pistons. The sectional view of FIG. 1 shows two pistons 80' and 82' from the inner ring and two pistons 78' and 84' from the outer ring.

FIGS. 1 and 6 show four cylindrical piston chambers 78, 80, 82 and 84, extending forwardly from the rearwardly face 62b of pump housing 62 not entirely through the thickness of the pump housing. Cylindrical pistons 78', 80', 82' and 84' are slidably mounted for reciprocation within their associated chambers 78–84 respectively. As shown in FIG. 1, outermost pistons 78' and 84' are located at a radius matching the radius of annular swash face 24a, while inner pistons 80' and 82' are each located at a radius to contact ring-shaped swash face 24b. Rearward pump housing 62 is engaged with rearwardly projecting lip 36b of flange 36 on differential housing 34 by splines 86 for rotation with differential housing 34.

Forward pump 58 is identical to rearward pump 62, but reversed such that pistons 88', 90', 92' and 94° are slidably mounted for reciprocation within piston chambers 88, 90, 92 and 94 formed in the forward face 58a of forward pump housing 58. Forward pump housing 58 engages the forwardly projecting lip 36a of flange 36 via splines 96 for rotation with differential housing 34. The rearward pump housing 62 is similarly connected for rotation with the differential housing 34.

An annular wall 98 projects rearwardly from the interior surface of the forward end 16a of housing 16, and has an annular surface on which the friction pads 100 mounted on outer piston heads 88'a and 94'a is in continuous contact. An adjustable swash plate 101 is pivotally connected to annular wall 98 by a pivot pin 104 extending perpendicularly to the longitudinal axis of input shaft 12 for pivotal movement of the plane of swash plate 101 from a 0° angle perpendicular to the longitudinal axis of input shaft 12, and an angle of 15° relative to a plane perpendicular to the longitudinal axis of input shaft 12 (and parallel to the angle of fixed swash plate swash face 24b). Adjustable swash plate 101 is pivoted on pin 104 by a link 106 connecting one edge of swash plate 101 to a threaded adjustment nut 108 on the end of a threaded shaft 110. Rotation of the head 110a of threaded shaft 110 will cause adjustment nut 108 to move along shaft 110, thereby pivoting swash plate 101 on pivot pin 104, to increase or decrease the angle of tilt.

Figure 5:
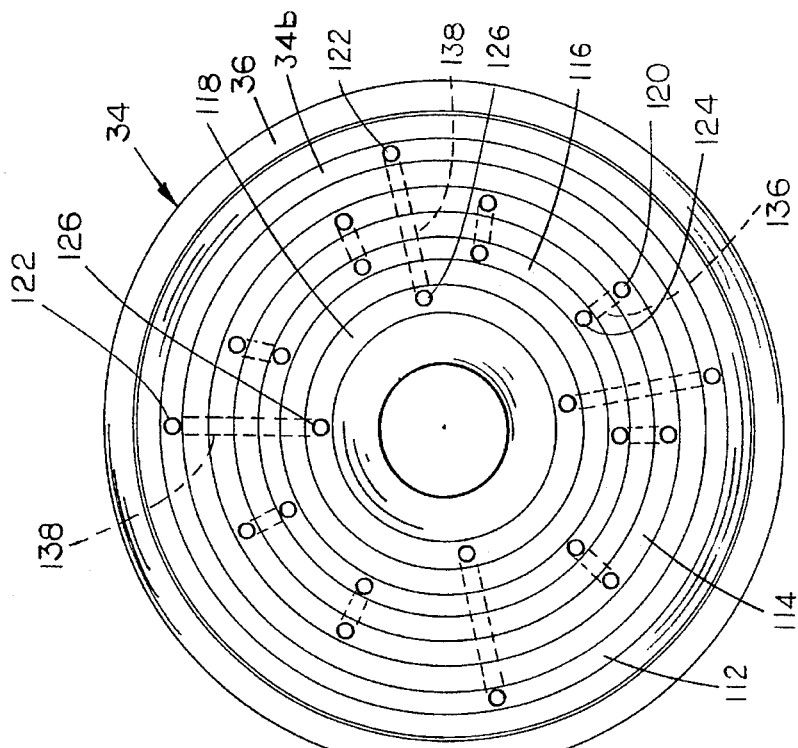
FIG. 5 is an elevational view of one face of the differential housing.

Referring now to FIGS. 5 and 6, differential housing 34 has a rearward face 34b identical to the forward face 34a. Four annular concentric grooves 112, 114, 116 and 118 are formed in the forward and rearward faces 34a and 34b of differential housing 34, the grooves being separated by annular ridges, and decreasing in diameter from an outer groove 112 to a small diameter inner groove 118. A plurality of passageways are formed through the thickness of differential housing 34, for the passage of hydraulic oil. As shown in FIG. 5, a plurality of passageways 120 formed through a thickness of housing 34 are aligned along the groove 114 to pass between groove 114 of face 34b and groove 114 on face 34a. A second set of passageways 122 are located along groove 112, a third set of passageways 124 are formed along groove 116, and a fourth set of passageways 126 are located in groove 118.

Figure 4:
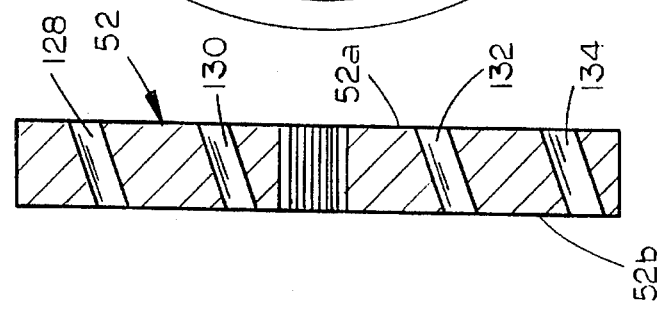
FIG. 4 is a sectional view taken at lines 4—4 in FIG. 3.
Figure 3:
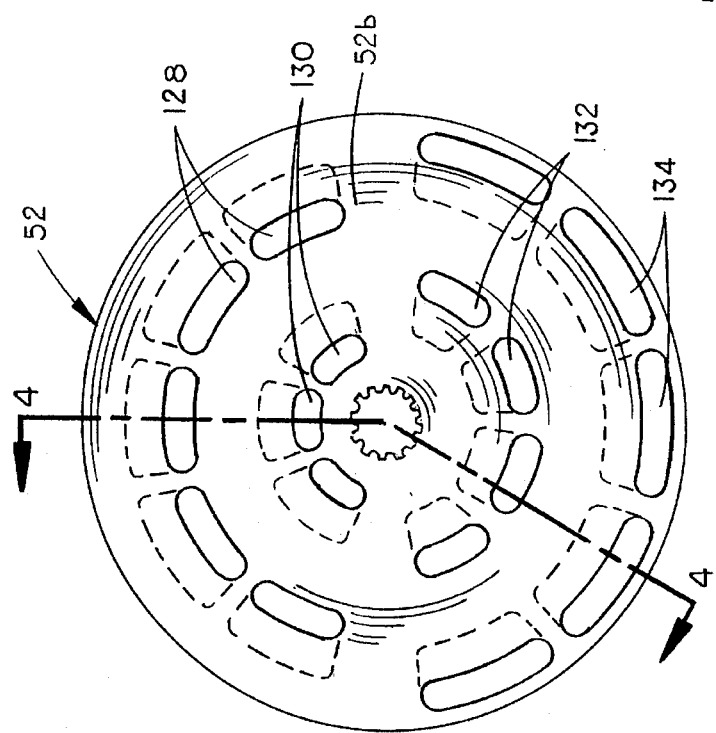
FIG. 3 is an elevational view of one face of a valve plate of the transmission.

Referring now to FIGS. 3 and 4, only one valve plate 52 is shown in face and sectional view, since valve plate 50 is identical thereto but reversed when placed within transmission 10. Valve plate 52 includes an upper half and lower half, if a center line is drawn through the rotational axis thereof. Valve plate 52 includes a differential-abutting face 52a, and a pump-abutting face 52b. As shown in FIG. 4, four ports, 128, 130, 132 and 134 are formed through the thickness of valve plate 52 to permit the passage of hydraulic fluid therethrough.

The correspondence of the ports of the valve plates with the differential housing passageways and piston chambers is best described by referring to FIG. 1. Rearward valve plate 52 rotates with swash plate 24 and directs the flow of hydraulic oil from piston chamber 80 (in rearward pump housing 62) through the passageways in differential housing 34 to a forward valve plate 50. It can be seen that the rotation of differential housing 34 will cause forward and rearward pump housings 58 and 62 to rotate therewith. When adjustable swash plate 101 is located in the neutral position, shown in FIG. 1, output shaft 14 will not rotate, thereby holding swash plate 24 still relative to rotating rearward pump housing 62. Thus, the rotation of differential unit 34 will cause pistons 80' and 82' to move in and out of rearward pump housing 62 as the pistons with friction pads 74 slide along on swash plate 24 (which is oriented at a 15° angle).

As piston 80' is moved to the position shown in FIG. 1, it will displace hydraulic oil in piston chamber 80 through rearward valve plate port 130 (see FIG. 6), thence through differential passageway 124 to forward valve plate port 130', and into forward pump housing piston chamber 90, thereby forcing piston 90' against adjustable swash plate 100. Thus, this would be the high pressure side of forward and rearward pumps 58 and 62. Simultaneously, piston 92' will be forcing hydraulic oil from piston chamber 92 through forward valve plate port 132' (see FIG. 6), differential housing passageway 122, rearward valve plate port 132 and into rearward piston chamber 82 to force piston 82' outwardly to the end of the piston stroke against fixed swash plate 24.

Oil pressure from the high pressure side of the pump is transferred from passageway 124 through radial passage 136 to passageway 120. Oil in passage 120 is directed along annular grooves 114 (see FIG. 6) to ports 134 and 134' in valve plates 52 and 50 and into piston chambers 84 and 94. Thus, the high pressure oil exerts pressure on pistons 94' and 84', respectively and against swash plates 98 and 24a. This pressure maintains the seals between pump housings 58 and 62, valve plates 50 and 52 and differential housing 34.

As discussed above, passageway 48 supplies oil from the charge pump rotor unit 46 to passageways 126 and 122 to grooves 112 and 118. This oil is thereby supplied through ports 128 and 128' to piston chambers 78 and 88, and through ports 132 and 132' to piston chambers 82 and 92, so as to maintain pistons 78' and 88' in contact with surface 98 and swash plate 24a.

Figure 2:
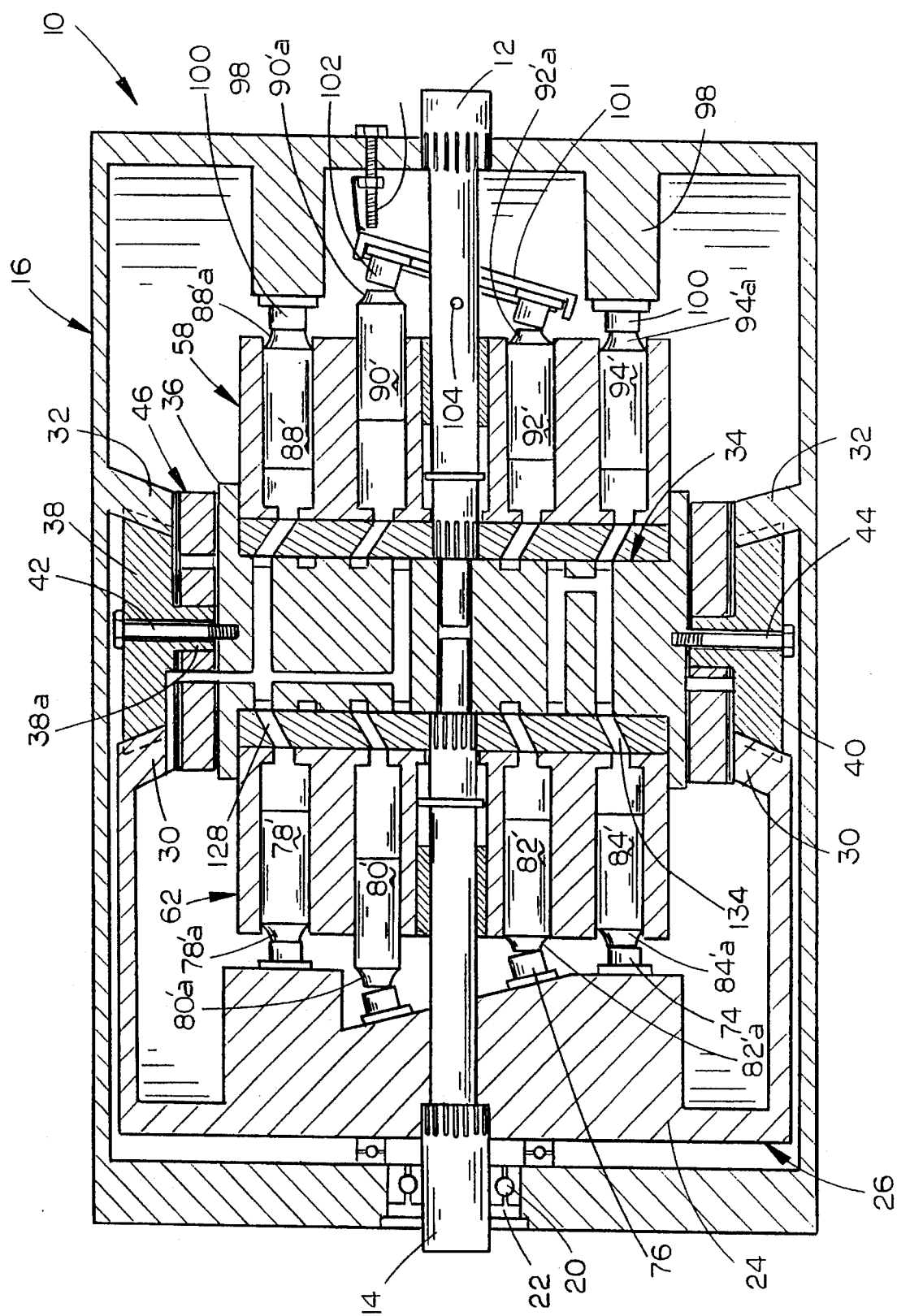
FIG. 2 is a sectional view similar to FIG. 1, but showing the variable swash plate rotated to a position wherein the transmission is in a direct drive setting.

When adjustable swash plate 101 is in the "neutral" position shown in FIG. 1, differential housing 34 will be rotating at a velocity one-half of the rotational speed of input shaft 12 and transmission housing 16, while output shaft 14 and swash plate 24 will not be rotating. In this position, oil will be directed to forward pump housing 58. As shown in FIG. 1, swash plate 101 is tilted at the same angle as swash plate surface 24b, when in the "neutral" position, such that piston chamber 90 will accept oil pumped from piston chamber 80. Referring to FIG. 2, adjustable swash plate 24 is oriented at a 0° angle such that piston chamber 90 will not accept any oil pumped from piston chamber 80. This results in a direct drive connection between input and output shafts 12 and 14, wherein transmission housing 16 rotates along with output housing 26, and wherein pumps 58 and 62, differential 34 and valve plates 50 and 52 all rotate at the same speed. Because all of these components are rotating at the same speed, pinion gears 38 and 40 will not be rotating, and no components within transmission housing 16 will be moving.

As adjustable swash plate 101 is moved between the direct drive position of FIG. 2 and the neutral position of FIG. 1, the speed of rotation of the differential unit 34 will vary, thereby changing the ratio of rotation of input shaft 12 with respect to output shaft 14. This adjustment of adjustable swash plate 101 occurs by rotation of shaft head 110a of threaded shaft 110 by an external electric motor (not shown).

Whereas the invention has been shown and described in connection with the preferred embodiment thereof, many modifications, substitutions and additions may be made which are within the intended broad scope of the appended claims.

I claim:

1. A hydrostatic differential transmission, comprising:

a hollow, cylindrical input housing having opposing forward and rearward ends and a cylindrical side wall;

an input drive shaft extending through an aperture in the forward wall of said input housing with a rearward end disposed within the interior of the input housing, said input shaft connected coaxially with said input housing for rotation therewith;

an output shaft extending through an aperture in the rearward end of the input housing with a forward end disposed within the interior of the input housing, said output shaft freely rotatable in the rearward end aperture, coaxial with the input shaft;

a generally disk-shaped differential coaxially mounted on the forward end of the output shaft and the rearward end of the input shaft, for free rotation on said shafts;

a plurality of pinion gears rotatably mounted uniformly around a circumferential surface of the differential for free rotation about axes extending radially from the differential;

a forward ring gear mounted on the interior of said input housing side wall for rotation therewith and in operable engagement with said pinion gears;

an output housing coaxially mounted on the rearward end of said output shaft within the interior of the input housing, for rotation with said output shaft;

said output housing including a generally disk-shaped base portion and a forwardly projecting cylindrical side wall;

a rearward ring gear mounted on a forward edge of said output housing side wall for rotation therewith and in operable engagement with said pinion gears;

a forward hydraulic pump rotatably mounted on said input shaft for free rotation thereon between a forward valve plate and a rearward surface of the input housing forward end;

said forward pump presenting a plurality of bores extending therethrough parallel to said input shaft and arranged uniformly around a circle concentric to said input shaft;

pistons disposed for reciprocating movement in the respective bores of said forward pump to displace hydraulic fluid therein;

a forward swash plate adjustable connected to the input housing for interaction with said forward pump pistons to effect reciprocating movement thereof;

a rearward hydraulic pump rotatably mounted on said output shaft for free rotation thereon between a rearward valve plate and the base of said output housing;

said rearward pump presenting a plurality of bores extending therethrough and arranged with passageways through the valve plates and differential in a substantially closed hydraulic circuit with said forward pump bores, whereby fluid displaced in each pump is directed to the other pump;

pistons disposed for reciprocating movement in the respective bores of the rearward pump to displace hydraulic fluid therein;

a rearward fixed swash plate formed on a forward surface of the output housing base for interaction with said rearward pump pistons to effect reciprocating movement thereof;

said rearward swash plate having a planar surface in contact with said rearward pump pistons, said surface oriented in a plane offset at a predetermined angle from perpendicular to the axis of the output shaft;

said forward swash plate adjustable mounted for selective pivotal movement from a neutral position within a plane oriented at the same angle from perpendicular to the input shaft axis as the fixed swash plate, to a direct-drive position within a plane oriented perpendicular to the axis of the input shaft;

said forward and rearward pumps connected to said differential for rotation therewith; and control means connected between said input housing and said forward swash plate, for selective adjustment of the forward swash plate between the neutral and direct-drive positions;

whereby rotation of the input shaft with the forward swash plate in the neutral position will cause a transfer of fluid between corresponding bores of said forward and rearward pumps; and whereby rotation of the input shaft with the forward swash plate in the direct drive position will prevent reciprocation of the forward pump pistons, thereby preventing flow of hydraulic fluid and locking the input and output shafts at substantially identical velocity.

2. The transmission of claim 1, wherein said control means includes means for pivoting said adjustable swash plate to a plurality of positions between the neutral and direct-drive positions.

3. The transmission of claim 1, further comprising a charge pump operably connected to one of said pinion gears and fluidly connected between a source of hydraulic fluid within the input housing and said hydraulic circuit, for continuously charging the hydraulic circuit in response to rotation of the charge pump and pinion gear.

4. The transmission of claim 1, further comprising:

forward means for biasing the forward pump into sealed contact with the forward valve plate and for biasing the forward valve plate into sealed contact with the differential, to maintain a sealed hydraulic circuit; and rearward means for biasing the rearward pump into sealed contact with the rearward valve plate and for biasing the rearward valve plate into sealed contact with the differential, to maintain a sealed hydraulic circuit.

5. The transmission of claim 1, wherein said passageways through said differential have forward openings arranged in a circle on a forward face of the differential and have rearward openings arranged in a circle on a rearward face of the differential, and further comprising an annular groove in the differential forward face interconnecting the forward openings and an annular groove in the differential rearward face interconnecting the rearward openings.

6. A hydrostatic differential transmission comprising:

an input shaft;

a first hydraulic pump presenting a plurality of bores with a piston disposed for reciprocating movement in each bore to displace hydraulic fluid therein;

a first pivotable swash plate presenting a surface disposed to interact with said pistons in a manner to effect reciprocating movement thereof in said bores when the swash plate is in a neutral position, and to prevent reciprocating movement of the pistons when the swash plate is in a direct drive position;

said first hydraulic pump mounted for free rotation on the input shaft, and said first swash plate mounted on the input shaft for rotation therewith;

a second hydraulic pump presenting a plurality of bores each of which receives a piston for reciprocating movement, said first and second pumps being arranged in a substantially closed hydraulic circuit whereby fluid displaced in each pump is directed to the other pump;

said second pump mounted for free rotation on an output shaft coaxial with the input shaft;

a second fixed swash plate presenting a surface disposed to interact with the pistons of the second pump in a manner to effect reciprocating movement thereof in said second pump bores;

a differential presenting a plurality of passageways therethrough, interposed between said pumps and connected to both said pumps for rotation therewith, said differential passageways fluidly connecting said bores of said pumps;

a first valve plate presenting a plurality of passageways therethrough, interposed between said differential and said first pump four selectively directing fluid flow between said differential passageways and said first pump bores, said first valve plate mounted for rotation on said input shaft;

a second valve plate presenting a plurality of passageways therethrough, interposed between said differential and said second pump for selectively directing fluid flow between said differential passageways and said second pump bores, said second valve plate mounted for rotation on said output shaft;

a plurality of pinion gears rotatably mounted around a circumferential surface of the differential, for free rotation about axes extending radially from the differential;

a first ring gear mounted for rotation on said input shaft and located for operable engagement with said pinion gears;

a second ring gear mounted for rotation on said output shaft and located for operable engagement with said pinion gears; and control means connected to said first swash plate for selectively pivoting the first swash plate between the neutral and direct drive positions and intermediate positions therebetween, to control the relative rotational speed of said input and output shafts.

* * * * *